Nov. 5, 1963  D. P. SHEPPARD  3,109,274
TWO-PIECE ROTARY POWER BLADE
Filed Dec. 18, 1959
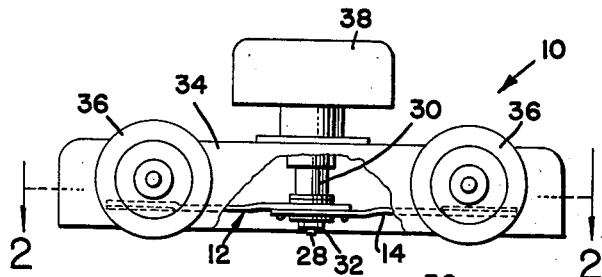
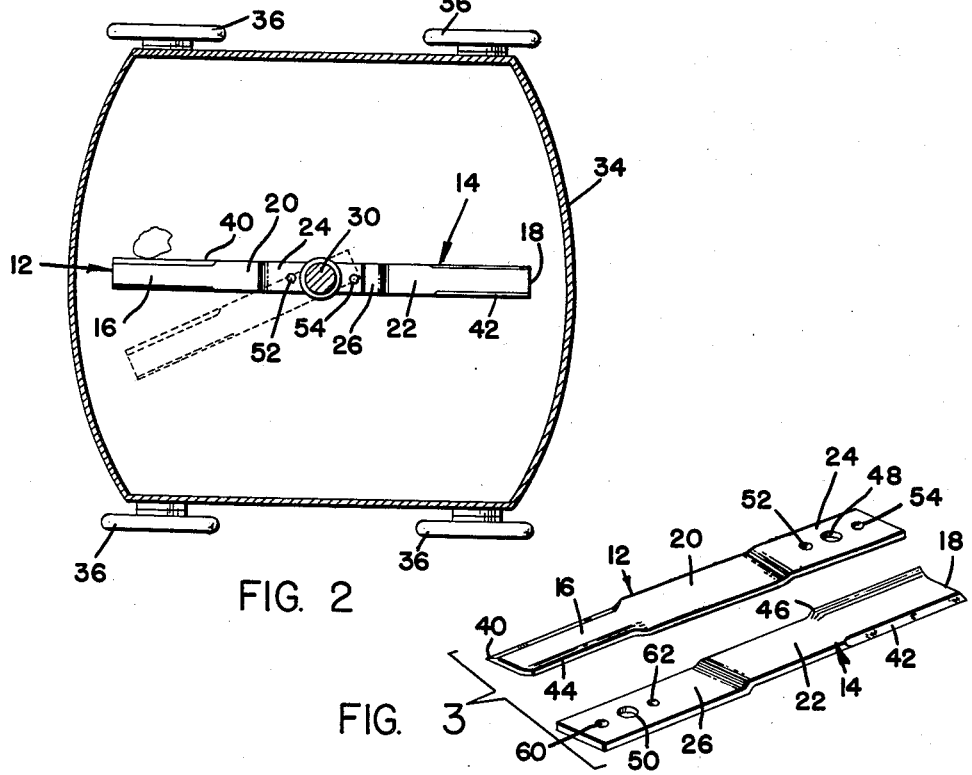
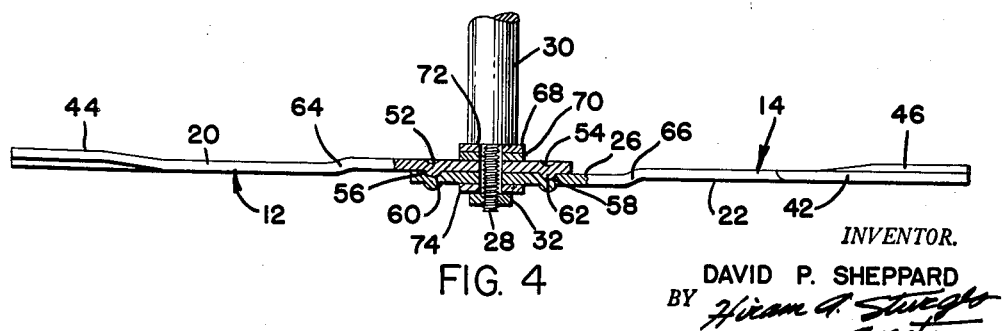
INVENTOR.
DAVID P. SHEPPARD
BY 3,109,274
TWO-PIECE ROTARY POWER BLADE
David P. Sheppard, 7712 Serum Ave., Ralston, Nebr.
Filed Dec. 18, 1959, Ser. No. 860,477
2 Claims. (Cl. 56—295)

This invention relates to power mowers of the rotary cutting blade type and wherein blades are carried on the lower end of a vertically disposed motor shaft, and in particular a pair of blades having overlapping inner ends mounted on the motor shaft and having projections and indentations for retaining the blades in alignment.

This application is a continuation-in-part of my co-pending application, now abandoned, filed August 14, 1959, with the Serial No. 833,736, in that projections and indentations are provided on and in the overlapping portions of the cutting blades to retain the blades in alignment.

The purpose of this invention is to provide a cutting blade for a rotary mower in which means is provided for permitting either end of the blade to yield upon engagement thereof with a rock, root, or other fixed obstruction, in order to prevent damaging the motor shaft.

Various types of springs and other friction or yielding connections have been provided between motor shafts and cutting blades. However, because of the high speed at which such blades travel the springs or friction elements have not been found successful as the momentum overcomes the resistance of the holding elements and the blades collapse resulting in vibration due to the blades being out of balance.

With this thought in mind this invention contemplates a two-piece blade for a power mower in which meshing projections and indentations retain the sections of the blade in alignment until an end of the blade comes in contact with a rock, root, or other fixed obstruction.

The object of this invention is, therefore, to provide means in a two-piece rotary mower blade for retaining the sections of the blade in alignment until the blade strikes a fixed obstruction.

Another object of the invention is to provide a two-piece mower blade constructed to yield upon engagement of an end thereof with a fixed object for reducing breakage in motor crankshafts and also for reducing the need for blade replacements.

When a one-piece mower blade, such as disclosed in the prior art strikes a rock or other obstruction with one of the ends the opposite end tries to continue forwardly in the direction of rotation with the tremendous momentum developed by the very high speed of rotation. By this means the crankshaft becomes bent and the bearings damaged. Another important object of this invention is, therefore, to provide means in a two-piece mower blade whereby one end of the blade yields upon engagement thereof with a fixed obstruction, and the opposite end assumes a jackknife position relieving the crankshaft of shock loads.

A further object of the invention is to provide meshing elements between sections of a two-piece mower blade whereby the sections are retained in extended positions and wherein the meshing elements provide positioning means so that after striking a fixed obstruction which causes one section of the blade to slip in relation to the other the blades are readily brought back to aligned positions.

A still further object of the invention is to provide a two-piece mower blade in which one section of the blade yields upon striking an obstruction, in which the blade is of simple and economical construction.

With these and other objects and advantages in view the invention embodies a power mower blade having two complementary sections with cutting elements on outer ends of the sections, shaft receiving openings extended through inner ends of the sections, and with projections or nodes of one section positioned in indentations of the other section for retaining the sections in alignment.

Other features and advantages of the invention will appear from the following description taken in connection with the drawings, wherein:

FIGURE 1 is a side elevational view of a power mower with a portion of the housing broken away to show the blade mounting therein.

FIGURE 2 is a sectional plan through the mower taken on line 2—2 of FIGURE 1.

FIGURE 3 is a perspective view showing two sections of a two-piece power mower blade.

FIGURE 4 is a side elevational view of a blade assembly of a two-piece rotary power mower blade with the mounting elements of the blade sections and blades shown in section.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout and in which the numeral 10 refers to the mower in its entirety, numerals 12 and 14 indicating a pair of blades having outer cutting sections 16 and 18, offset intermediate sections 20 and 22, and overlapping sections 24 and 26, numeral 28 indicating a threaded stud extending from the lower end of the crankshaft 30, and having a lock nut 32 thereon, numeral 34 indicating a housing having wheels 36 and numeral 38 a motor from which the shaft 30 extends.

The cutting sections 16 and 18 of the blades 12 and 14 are provided with sharp edges 40 and 42, respectively, and the opposite edges of the portions 16 and 18 are curved upwardy as shown at the points 44 and 46. The overlapping portions of the blades are provided with center openings 48 and 50, through which the stud 28 extends, and the portion 24 of the section 12 of the blade is provided with indentations 52 and 54 in the upper surface and nodes 56 and 58 on the under surface. The nodes 56 and 58 are positioned in indentations 60 and 62 in the upper surface of the portion 26 of the section 14.

In order to position the cutting edges of the sections 12 and 14 in the same horizontal plane the portion 20 of the section 12 is offset downwardly from the portion 24 at the point 64 the distance equal to one-half of the thickness of the blade section, and the portion 22 of the blade section 14 is offset upwardly, the same distance, from the portion 26 at the point 66.

The slip of a section of the blade upon striking a fixed obstruction is controlled by the sizes of the nodes and indentations in combination with the friction washers 68 and 70 positioned between the sections of the blade and a shoulder 72 of the shaft 30. A washer 74 is positioned between the sections of the cutting blade and lock nut 32.

With the parts assembled as illustrated and described a two-piece mower blade is provided wherein the two sections or ends of the blade are free to pivot on the crankshaft independently. With this construction when one end of the blade strikes an obstruction the other end is free to jack-knife, swinging forwardly out of its normal position of diametrical alignment. By this means the forward movement of the other end of the blade absorbs and dissipates the otherwise damaging force caused by the momentum resulting from the high speed. The excessive strains and stresses normally required to be absorbed by a crankshaft of a power mower when a blade strikes a rock or other obstruction are, therefore, eliminated.

After striking a rock or other obstruction the sections of the blade are readily straightened until the nodes drop into the indentations, or, if damaged, the section striking the obstruction may readily be replaced.

From the foregoing specification it will become apparent that the invention disclosed will adequately accomplish the functions for which it has been designed and in an economical manner, and that its simplicity, accuracy, and ease of operation are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings.

Changes in shape, size, and arrangement of details and parts such as come within the purview of the invention claimed may be resorted to in actual practice, if desired.

Having now described the invention that which is claimed to be new and desired to be procured by Letters Patent, is:

1. In a two-piece rotary power mower blade, the combination which comprises a pair of duplicate blade sections, each of said blade sections having cutting edges on outer parts of leading sides thereof and having overlapping portions on inner ends, said overlapping portions of the blade sections having crankshaft receiving openings therethrough and registering nodes and indentations on and in meeting surfaces of said overlapping portions, the nodes and indentations being equally spaced from centers of the crankshaft receiving openings, and the blade sections being offset vertically to compensate for the thickness of the material of the sections, and friction washers positioned on the blade sections.

2. In a rotary power mower blade first and second sections having overlapping ends, said first section being elongated and being normally generally horizontally disposed and having an outer end which has a cutting edge and an inner end which defines that said end which laps said second section, said first and second sections having registering vertical pivot member receiving openings therethrough, a pivot member disposed through said pivot member openings and pivotally received in at least one of said pivot member openings for mounting said first section swingably with respect to said second section, and overcomable retaining means operatively associated with said blade sections to maintain said blade sections in alignment, said retaining means being overcomable by the force of the striking of one blade section against a foreign object, said overcomable retaining means comprising registering node and indentation means on and in respective meeting surfaces of said overlapping sections, said node means being fixed to the respective blade, whereby said node means is normally received in said indentation means except when forced out of said indentation means by the striking of one of said sections against such an object.

References Cited in the file of this patent

UNITED STATES PATENTS

| | | |
|---|---|---|
| 1,855,832 | Hind | Apr. 26, 1932 |
| 2,034,505 | Cline | Mar. 17, 1936 |
| 2,627,156 | Carter | Feb. 3, 1953 |
| 2,634,571 | Lawrence et al. | Apr. 14, 1953 |
| 2,697,323 | Horn | Dec. 21, 1954 |
| 2,716,323 | Ford | Aug. 30, 1955 |
| 2,720,070 | Arrington | Oct. 11, 1955 |
| 2,822,657 | Chaffee | Feb. 11, 1958 |
| 2,856,747 | Kolls | Oct. 21, 1958 |
| 3,050,925 | West | Aug. 28, 1962 |